Sept. 8, 1925.  1,552,414
S. APOSTOLOFF
DRY CELL
Filed Dec. 2, 1919
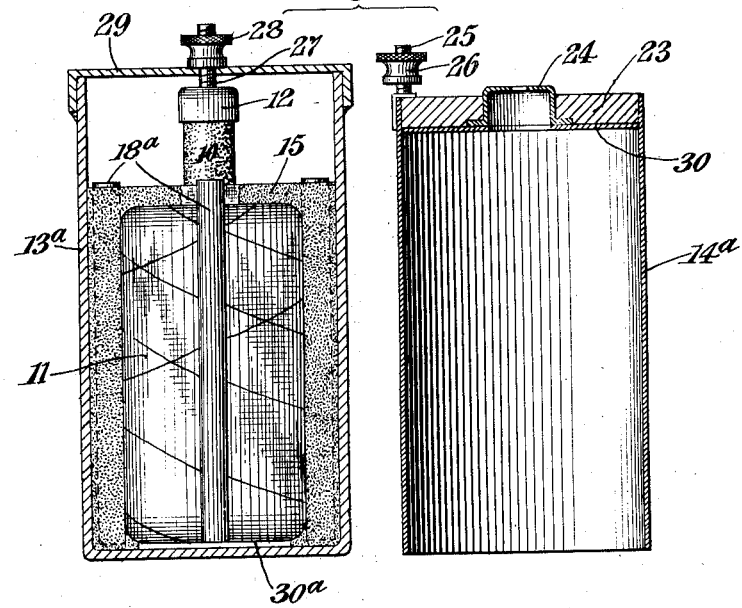
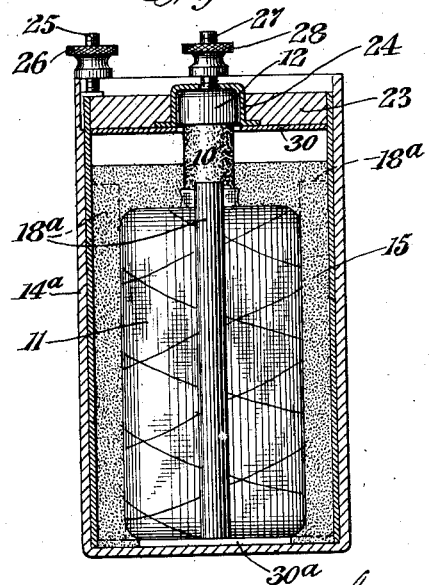

Patented Sept. 8, 1925.

1,552,414

UNITED STATES PATENT OFFICE.

SERGE APOSTOLOFF, OF NEW YORK, N. Y.

DRY CELL.

Application filed December 2, 1919. Serial No. 341,848.

*To all whom it may concern:*

Be it known that I, SERGE APOSTOLOFF, a subject of the King of Great Britain, residing in the borough of Manhattan, city, county, and State of New York, have invented certain new and useful Improvements in Dry Cells, of which the following is a specification.

This invention relates to improvements in dry cells of the type where the electrodes and paste are kept out of operative relation until it is desired to use the cells.

One object of this invention is to produce a battery cell with the electrolyte in approximately normal position, which may be kept for a long time without deterioration, but which may be very quickly and easily made ready for immediate use.

In the old type of dry cell the action of the paste on the metallic container is quite destructive, even when the cell is on open circuit. For example, many of such cells lose over forty per cent of their efficiency in less than three months.

By my invention all destructive action of the paste on the metallic container is entirely eliminated while such cells are held in stock by a dealer or by a purchaser prior to their actual use. The cells manufactured according to applicant's invention may be shipped long distances without impairment of their efficiency.

A further object is to produce a dry cell, the parts of which may be very cheaply and independently manufactured, and which may be shipped separately, if desired, to any locality where they are to be assembled.

In my co-pending application, Serial Number 257,651, I have shown and described a type of cell having a tubular sleeve carrying the bobbin suspended therein and a lower cup which contains an electrolyte paste, out of contact with the bobbin, but ready for instant use. To put this type of cell into action it was necessary to force the paste up from the lower cup into the space between the bobbin and its tubular sleeve, by telescoping the cups.

In my present invention, I provide a cell having a bobbin, a tubular sleeve, and a cup, but I locate my paste initially around the bobbin instead of in the bottom of the cup.

My broad invention may be embodied in two distinct forms. In each form the bobbin is carried within a tubular sleeve. In the first form, the tubular sleeve is closed at the top, while in the second form it is closed at the bottom. In either case the prepared paste occupies the space immediately adjacent to the bobbin, and the cell may be made active by telescoping the sleeve and the cup.

In the employment of my invention, the zinc cup, the bobbin, the electrolyte paste, and the container will first be made separately. The manufacturer may then, if desired, insert the bobbin into its container and surround it by the electrolyte paste, but the zinc cup will not be inserted until it is desired to use the cell.

An important advantage secured by my invention is that substantially no movement of the paste is necessary in assembling the parts in order to activate the cell, the initial and final positions of the paste being practically identical.

A further advantage of this type of cell is that it will instantly reach its maximum power when collapsed. This will be obvious from the fact that the carbon electrodes and the depolarizer are thoroughly impregnated with the paste from the beginning, and that when the zinc is inserted no time is required for the paste to diffuse through the depolarizer.

Figure 1 is a sectional view of a battery cell made in accordance with one embodiment of my invention with the parts out of operative position.

Figure 2 is a sectional view of the parts in Figure 1 assembled for immediate use.

Similar reference characters refer to similar parts throughout the several views.

Referring now to the drawings, the carbon electrode 10 has the usual depolarizing mass suitably secured in place around it by a container 11 of cloth or the like. A metallic terminal or contact cap 12 is secured to the top of the carbon electrode. The parts 10, 11 and 12 and the depolarizing mass will be hereinafter referred to as the bobbin, in accordance with the terminology of the trade.

The bobbin is surrounded by the paste 15 and the vertical wooden separating members 18, and is insulated from the bottom of the container 13ᵃ by a suitable washer 30ᵃ, preferably of fibrous material.

The terminal of the carbon electrode is provided with a threaded post 27 and the milled nut 28. The temporary cap 29 composed preferably of the same material as the container 13ª serves to prevent evaporation or absorption of moisture as the case may be. If desired, a layer of wax may be inserted at the edge of this cap, as shown, to still further protect the paste from change.

The zinc cup 14ª is open at the bottom instead of at the top and is provided with a terminal consisting of the binding post 25, upon which the nut 26 is threaded.

The top of the zinc cup 14ª is also provided with the socket 24 of brass or other metal, having a central aperture to receive the binding post 27 of the carbon electrode. This socket is supported by the seal 23 preferably of pitch, and the annular washer 30 of fibrous material.

To assemble this cell from the inactive position shown in Figure 1 to the active position shown in Figure 2, it is merely necessary to remove the nut 28 and the cap 29 and to insert the zinc electrode 14ª from above into the position shown in Figure 2.

It will be obvious that in either form of my invention, the cells may be easily recharged at any time. This may be done by removing the zinc cup, washing the exhausted paste from the bobbin and the cup, refilling with fresh paste, and then forcing the zinc cup again into operative position.

The outside containers 13 and 13ª may be made of any waterproof insulating material. I prefer, however, to use cardboard suitably impregnated with paraffin. I may also use glazed or enameled metal. Another method of constructing the outside container is to coat the cardboard tube with celluloid on the inside and paraffin on the outside. Owing to the non-metallic character of the container 13, the ordinary exterior insulating covering may be dispensed with. This is particularly advantageous when the cells are to be placed in metal flashlight tubes.

It will be noted from an inspection of Figure 1 that the paste does not entirely fill the inside of the cell, but that there is an air space in the top. This is to prevent the paste from creeping up above the pitch seal and to allow for the slight upward flow of the paste 15 displaced by the zinc electrode when it is inserted. The quantity of paste initially placed in the container will be equal to the cubic capacity of the inside of the cell diminished by the volume of the air space, the volume of the bobbin and spacers 18, and the displacement of the zinc cup in assembled position.

The parallel spacers 18 on the outside of the bobbin may be of any convenient number. Four of such spacers are preferred by applicant.

In carrying out my invention, I do not desire to be limited to any of the examples disclosed herein, but it will be understood that many variations may be made within the general principles and scope of the invention.

I claim:

1. In a dry cell of the type described, a cup-shaped container open at the top, a cover therefor, a supply of electrolytic paste in said container, a central carbon electrode embedded in said paste, means located between the carbon electrode and the container to hold the carbon securely in its central position, a tubular zinc electrode open at the bottom adapted to be inserted downwardly into the paste to surround the carbon electrode to activate the cell, and the said zinc and carbon electrodes having terminal means secured to the top thereof.

2. In a dry cell of the type described, a zinc electrode consisting of a tubular sleeve open at the bottom and having a top with a central perforation adapted to fit over the terminal of a carbon electrode.

3. In a dry cell of the type described, a non-conducting cup open at the top, a bobbin in said cup initially surrounded by electrolyte paste, a zinc electrode adapted to be inserted from above into the space between the bobbin and the non-conducting cup to activate the cell.

4. A zinc electrode for a cell of the type described, comprising a zinc tube closed at the top by a seal of non-conducting material, said seal having a central opening for detachably receiving the terminal of a carbon electrode.

5. A zinc electrode for a cell of the type described, comprising a zinc tube closed at the top by a seal of non-conducting material, said seal having a central socket member for the reception of the binding post of a carbon electrode.

6. In a dry cell of the type described a carbon electrode having a terminal consisting of a metallic cap and a binding post, a tubular zinc electrode having a central socket member for receiving the terminal of the carbon electrode, said zinc electrode also having a terminal at the top thereof.

7. In an inactive dry cell of the type described, an electrolyte container, a bobbin centrally located within said container and having a binding post upon the top thereof, a detachable cover for said container, said cover having a central opening through which the binding post of the bobbin extends.

8. In a dry cell of the type described, a cup-shaped container open at the top, a cover therefor, a supply of electrolytic paste within said container, a central carbon electrode embedded in said paste, means to hold the carbon electrode in central position, and a tubular zinc electrode adapted to be inserted downwardly into the paste to surround the carbon electrode to activate the cell.

9. In a dry cell of the type described, an electrolyte container initially holding the electrolyte and a bobbin, a cover for said container, said cover having a central opening for holding the bobbin in central position, said closure being detachable from the container and the bobbin.

10. In a dry cell of the type described, a cup-shaped container open at the top, an electrolyte paste in said container, a cathode embedded in said paste, means to hold the cathode in central position, and an anode adapted to be inserted from above to activate the cell.

11. In a dry cell of the type described, an anode and a cathode, and a non-conducting cup having paste located therein, said non-conducting cup being open at the top.

12. In a dry cell of the type described, an electrolyte, a container therefor, a detachable cover for the electrolyte container, said cover having a central perforation adapted to fit around the terminal of a carbon electrode.

13. In a dry cell of the type described, a tubular anode having a closure with a central opening, a container, paste in said container, a bobbin at all times within said container and embedded in said paste, a detachable cover for said container for hermetically sealing the cell until it is desired to put it into use, said cover having a central perforation for receiving the terminal of the carbon electrode and holding the cover in position, the tubular anode being initially located outside of the cell, the cell being adapted to be activated by removing the detachable cover of the container and inserting the tubular anode around the bobbin.

14. In a dry cell adapted to remain inactive until it is desired to put it into use, an anode, a cathode, an electrolyte, means to depolarize the cathode, a tubular member surrounding said cathode at all times, said tubular member being closed at the bottom and being filled with the electrolyte, said anode being initially out of contact with the paste.

In testimony whereof, I have affixed my signature to this specification.

SERGE APOSTOLOFF.